Nov. 20, 1951 E. WOLFF 2,575,402
AUTOMATIC STEM LOCK FOR DIAPHRAGM VALVES
Filed Nov. 27, 1948 3 Sheets-Sheet 2

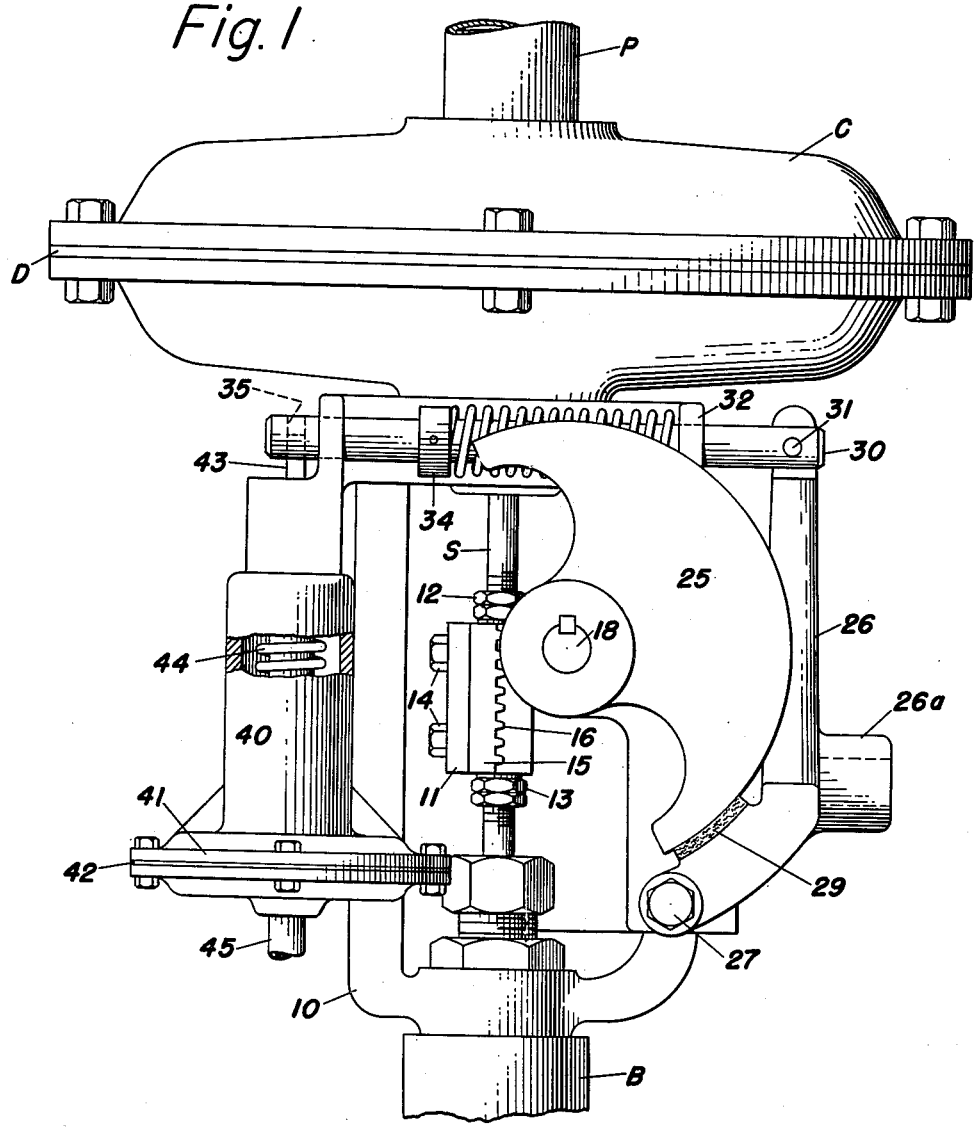

INVENTOR.
EMANUEL WOLFF
BY
ATTORNEY

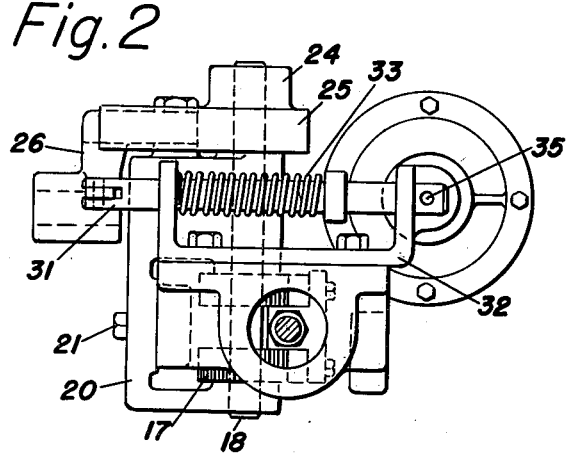
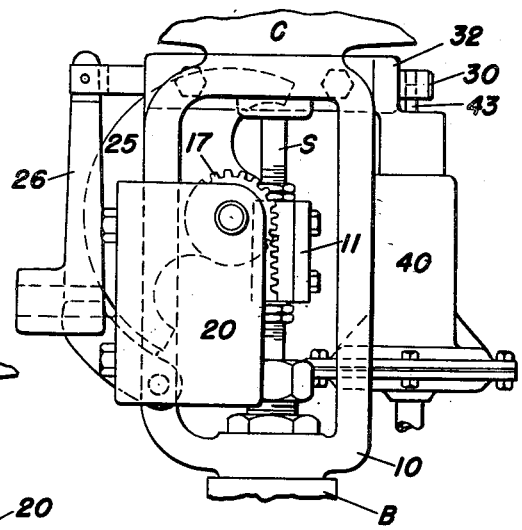
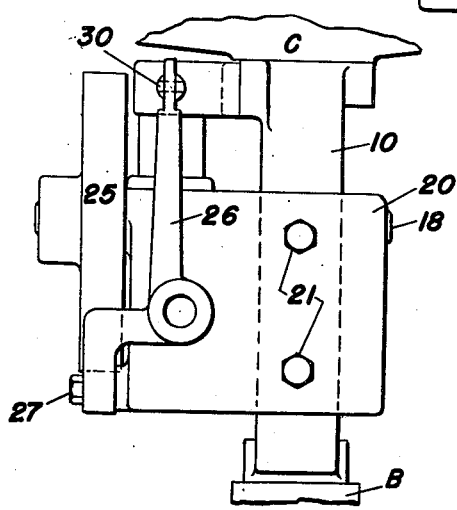

Patented Nov. 20, 1951

2,575,402

UNITED STATES PATENT OFFICE 2,575,402

AUTOMATIC STEM LOCK FOR DIAPHRAGM VALVES

Emanuel Wolff, Philadelphia, Pa., assignor, by mesne assignments, to Minneapolis-Honeywell Regulator Company, Minneapolis, Minn., a corporation of Delaware Application November 27, 1948, Serial No. 62,285

3 Claims. (Cl. 188—166)

Diaphragm valves are employed for many purposes and while differing in specific details of construction embody essentially a fluid actuated diaphragm, a spring biasing the pressure of the fluid against the diaphragm, a valve stem movable with the diaphragm and carrying a control element such as a valve disk adapted in accordance with its position as determined by that of the diaphragm to control a flow of fluid or the like; thus as long as the fluid pressure on the diaphragm remains at a constant value sufficient to counterbalance the bias of the spring the control element is maintained in a definite position from which it is moved in one direction or the other by an increase or decrease in the said pressure during the normal operation of the valve. However, following a marked decrease in the said pressure due to failure of the pump or other pressure creating means to function, a blowout in the line or the like, but little or no resistance is then exerted against the spring and the latter thus moves the valve stem and control element to its limit position in the direction in which the spring is acting and so fully opens or closes the valve depending on its specific construction.

Now in many installations it is desirable upon such pump failure, pressure line blowout or the like to immobilize the valve stem and consequently its control element substantially in the position they occupy just prior to the accident so that the flow controlled by the valve will continue at substantially the same rate until normal conditions are restored instead of being increased to a maximum or shut off entirely.

The principal object of my invention therefore is the provision of means for accomplishing this result and which are consequently adapted to automatically and positively lock and thereafter, pending restoration of normal operating conditions, maintain the valve stem and control element substantially in the positions which they occupied just prior to a substantial decrease in or entire failure of the pressure of the actuating fluid supply.

A further object is the provision of an automatic stem lock for diaphragm valves and the like which is positive in operation, comprises parts of simple construction and of a character not likely to get out of order or become damaged in use, and which is adapted for incorporation in new diaphragm valves during their course of manufacture and in many instances for installation on existing valves without necessitating material modification thereof.

Other objects, advantages and novel features of design, construction and arrangement comprehended by the invention are hereinafter more fully pointed out or will be apparent to those skilled in the art from the following description of two embodiments thereof as illustrated in the accompanying drawings in which are shown only so much of the valves with which my automatic stem lock is associated as is requisite for an adequate comprehension of the invention.

Thus, in the said drawings, Fig. 1 is an elevation of one form of the invention as applied to a typical diaphragm valve;

Fig. 2, on a scale smaller than Fig. 1, is a top plan view of the mechanism shown therein with the valve diaphragm and its casing removed;

Fig. 3 is an elevation of the other side of said mechanism on the same scale as Fig. 2; and Fig. 4 is an end view thereof;

Figure 5:
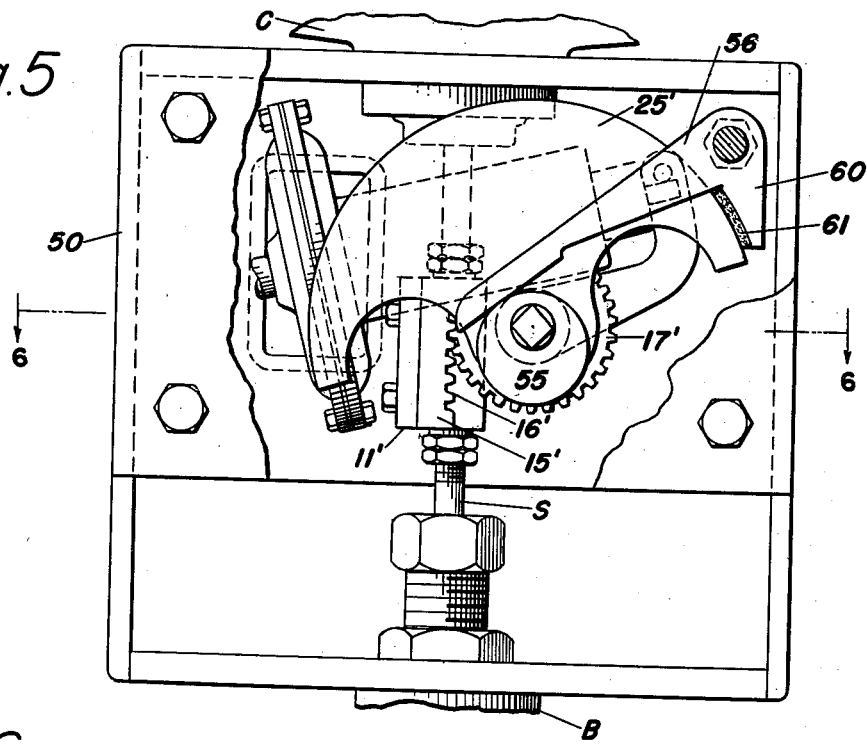
Fig. 5 is a partially fragmentary side elevation of another form of the invention.

Referring first more particularly to the form of the invention shown in Figs. 1-4 inclusive, the diaphragm valve in which the lock is shown as operatively installed includes the usual two-part diaphragm casing C, diaphragm D, body B and valve stem S, the mechanism of my invention being interposed between the lower part of the casing and the subjacent valve body in which may be housed the spring for actuating stem S though in other constructions the spring may be housed in a casing depending from the lower part of the diaphragm casing and so above instead of below the locking mechanism. As shown, the latter comprises an open frame 10 which is interposed between casing C and body B and through which substantially at its center the stem reciprocates. In accordance with the invention the stem instead of being continuous is made in two parts, the lower part extending into the body and the upper part to the diaphragm and the proximate ends of these parts are threaded into a generally T-shaped block 11 and locked thereto by lock nuts 12, 13 above and below the block so that in effect the latter forms a coupling between the two parts of the stem whereby both parts and the block will move unitarily under the influence of the diaphragm or valve spring as the case may be.

Secured as by bolts 14 to this block on either side of and paralleling the stem are rack bars 15 provided with rack teeth 16, and a pair of gears 17 respectively having teeth meshing with the racks are disposed on a transverse shaft 18 and keyed or otherwise suitably secured thereto so as to rotate therewith, the shaft in turn being journaled in the extremities of a generally U-shaped bracket 20 bolted to frame 10 by bolts 21 or otherwise removably secured thereto so as to facilitate assembly. Shaft 18 extends normal to the axis of the valve stem and it will be apparent that as the latter reciprocates the shaft is caused to turn in one direction or the other through the coaction of rack bars 15 with gears 17.

The shaft at one extremity carries the hub 24 of a substantially semicircular drum 25, the hub being keyed or otherwise fixed to the shaft and the parts being so arranged that when the valve stem is approximately in its lowest limit position as shown the drum occupies about the position illustrated and when the valve stem moves upwardly the drum turns clockwise in Fig. 1.

Means now to be described are provided for applying to the periphery of the drum a force sufficient to lock and thereafter maintain it in any position which it may occupy in accordance with the position of the valve stem at the time that a material decrease or failure of the fluid pressure occurs in the main pressure line or other source of pressure, this force, which is applied almost instantaneously, being sufficient to negative the tendency of the valve spring to move the valve stem to its limit position. To this end the U-shaped bracket 20 is provided with a boss adjacent its lower extremity forming a seat for one end of a brake lever 26 which is pivotally disposed on a bolt 27 extending into the boss, the free arm of the lever being offset inwardly so as to clear the drum and extending upwardly in a generally vertical direction. The lower end of the lever is curved proximate its pivotal point so as to conform generally with the periphery of the drum lying in vertical alignment with this portion of it which, in turn, is provided with a shoe 29 of leather or other friction material engageable with the drum when the lever is moved sufficiently counterclockwise about its pivot; preferably the shoe is of such thickness and so arranged that under normal conditions there is little or no clearance between it and the drum so that the shoe is brought very firmly against the latter by a small movement of the lever.

The free end of the lever is received in a fork in an end of a rod 30 to which the lever is pivoted at 31, the rod lying transversely to stem S and slidably extending through the arms of a yoke 32 bolted to the upper part of the frame. The rod is surrounded by a compression coil spring 33 disposed between one arm of the yoke and a collar 34 pinned to the rod in spaced relation to the other arm of the yoke through which the rod projects and in this projecting portion the rod is provided with a transverse bore 35.

The yoke 32 or rather that arm thereof proximate bore 35 supports an auxiliary diaphragm assembly comprising a cylindrical body 40 merging into a separable diaphragm casing 41 between the parts of which extends a diaphragm 42, the yoke arm being either integral with the body or suitably rigidly connected thereto as by welding or otherwise. Within this body is a plunger 43 surrounded by a coil spring 44 acting in opposition to fluid pressure introduced beneath the diaphragm through a pipe 45, the upper extremity of the plunger being reduced in diameter so as to readily enter bore 35 in rod 30 when the plunger is in raised, that is, normal, position under the influence of the pressure exerted on the diaphragm in opposition to the bias of spring 44 whereby spring 33 is held under compression and the rod and lever 26 so positioned that the brake shoe 29 is either out of contact or in very slight engagement with drum 25.

Figure 6:
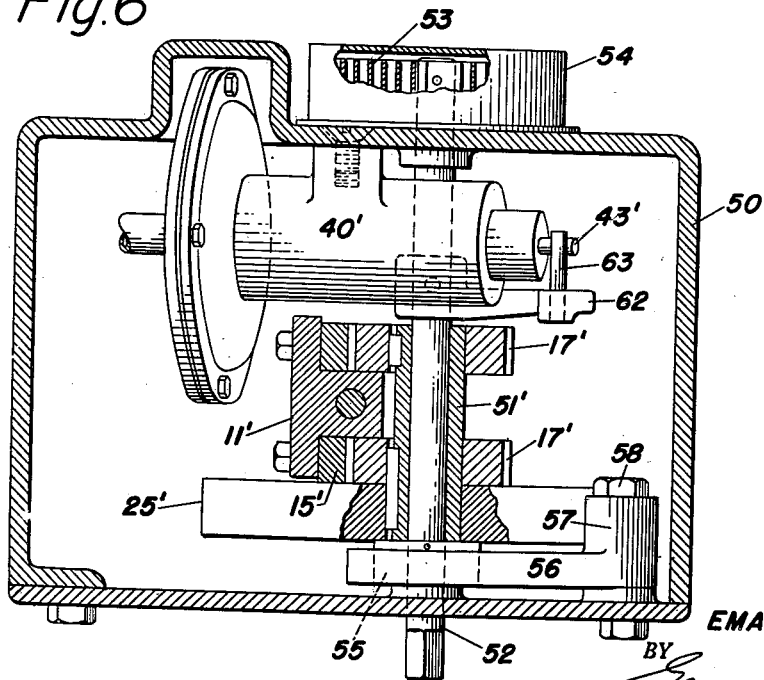
Fig. 6 illustrates the mechanism shown in Fig. 5 with the diaphragm casing removed, this view being partially in top plan and partially in horizontal section substantially on the line 6—6 in Fig. 5.

I shall now refer to the form of the invention illustrated in Figs. 5 and 6, which may be deemed preferable for use under certain operating conditions or for other reasons, and shall then describe more specifically the operation of both of the forms herein disclosed.

The mechanism as shown in said figures is desirably enclosed in a substantially rectangular housing generally designated as 50 which may be interposed either between the main diaphragm casing C and the subjacent valve body B as shown or below the latter. Through this housing valve stem S passes, the stem being divided as hitherto explained and coupled together by a T-shaped member 11' carrying racks 15' having ratchet teeth 16' adapted respectively to mesh with a pair of gears 17' keyed to a sleeve 51 rotatable on a transverse shaft 52 extending through the housing, one side of which is made removable for convenience of assembly and access to the parts enclosed in it.

As in the case of the earlier described form of the invention a segmental drum 25' also is provided and likewise keyed to sleeve 51 so that as valve stem S moves up and down during normal operation of the valve the drum will be correspondingly oscillated through the coaction of the gears with the racks. Shaft 52 at one end beyond the housing preferably is squared for a purpose hereinafter described while its other projected end is surrounded by a spiral "clock" spring 53 disposed in a cup 54 detachably fastened to the housing to facilitate access to the spring the ends of which are respectively secured to the shaft and to the cup or other suitable stationary part in such manner that the spring tends to turn the shaft in a clockwise direction as when viewed as in Fig. 5.

At a suitable point in its length and preferably adjacent the drum segment an eccentric cam 55 is mounted on the shaft and secured thereto so as to turn therewith, while a brake lever 56 overlies and engages this cam at its free end. This lever comprises a boss 57 through which extends a bolt 58 pivotally securing the lever to the housing, and from the boss depends an arm 60 having a face curved in correspondence to the drum and aligned therewith to which is secured a brake shoe 61, the arrangement being such that when the lever is turned clockwise in Fig. 5 by cam 55, substantially on the low point of which the lever normally rests, the shoe is forcibly applied to the drum.

Shaft 52 also carries a lever 62, pinned or otherwise fastened to it and the free end of this lever is supplied with a detent pin 63 which normally overlies the reduced end of a plunger 43' of an auxiliary diaphragm assembly similar to that already described save that its body 40' is arranged in an angular position above shaft 52 and suitably supported therein in any convenient way as by a lug integral with the casing extending to the housing wall and welded or otherwise secured thereto. Consequently when fluid under pressure is admitted through a pipe connection (not shown) to the auxiliary diaphragm casing 41' on the opposite side of its diaphragm from that adjacent the plunger actuating spring and plunger 43' is thereby projected, as shown, it engages beneath detent 63 on lever 62 and prevents shaft 52 from turning in a clockwise direction when viewed as in Fig. 5.

Operation

Referring first to the form of the invention shown in Figs. 1-4, it will be understood that, in accord with usual practice, the operating air or other fluid admitted through pipe P above the valve diaphragm is at relatively low pressure, for example 12 or 14 lbs. per square inch, whereas the pressure in the main supply line in the plant is much higher, for example in the vicinity of 70 lbs. per square inch, the reduction between this line pressure and the valve being effected by any suitable means such as a reducing valve (not shown) in the usual way, whereas the fluid admitted to the auxiliary diaphragm chamber through connection 45 is at the line pressure and thus much in excess of that in casing C.

For convenience of illustration the parts are shown in the positions which they occupy when the valve stem is substantially at the lowermost limit of its possible movement and it will be apparent that as it moves up from this position following a slight reduction in pressure on the valve diaphragm, drum 25 will be turned clockwise through coaction of rack bars 15 and gears 17. As the engagement of the end of auxiliary valve plunger 43 in bore 35 in rod 30 holds shoe 29 in a position in which it exerts but little or no friction against the drum, this movement of the latter is unobstructed and the valve can operate in the normal way to position the control element on the valve stem in accordance with the pressure developed above diaphragm D and when and as this pressure varies slightly the valve stem can reciprocate between its limit positions with corresponding movement of the drum in one direction or the other.

However, upon accidental or other failure of the main line pressure in the plant, the pressure in auxiliary diaphragm casing 41 is immediately correspondingly lowered and spring 44 becomes effective to force plunger 43 downward sufficiently to withdraw it from bore 35 of rod 30 thus permitting spring 33 to force collar 34 and rod 30 to the right so as to turn lever 26 counterclockwise in Fig. 1 and bring shoe 29 tightly against the drum in whatever position the latter may happen to be, thus locking the drum and in turn the valve stem in that position. Because of the differential in pressures in diaphragm casings 41 and C, this locking of the drum occurs at a relatively considerable time before the pressure failure is felt in casing C and so before the spring in valve body B can move valve stem S from its then position with the result that the valve is locked and thereafter held in that position until normal operating conditions are restored. To facilitatae resetting of the mechanism at that time, that is, after adequate air pressure is again available in the main supply line, lever 26 may be provided with a boss 26a having a central bore in which the end of a bar can be inserted to afford sufficient leverage to turn the lever clockwise in Fig. 1 and move rod 30 to the right against the bias of spring 33 until the end of plunger 43 can enter opening 35 in the rod.

The operation of that form of the invention shown in Figs. 5 and 6 is substantially similar to that of the form just described in that as valve stem S is reciprocated in normal operation gears 17' and drum 25' are actuated since sleeve 51 is free to turn on shaft 52 while as long as adequate line pressure is maintained plunger 43' is projected and so lies beneath detent 63 on lever 62 to hold shaft 52 against clockwise rotation in the sleeve under the urge of spring 53. However, upon failure of or material decrease in the line pressure the plunger actuating spring in body 40' becomes immediately effective to withdraw the plunger from detent 63 so as to allow shaft 52, under the influence of its spring, to rotate clockwise in Fig. 5 with corresponding rotation of cam 55. This raises lever 56 from its normal position and forces brake shoe 61 against drum 25' whatever be its then position as dictated by the position of stem S, thus locking the drum and in turn the stem against further movement and maintaining the control element on the stem in corresponding position until normal conditions are restored. To facilitate resetting the mechanism after adequate pressure in the main line is again available, the end of shaft 52 is desirably squared for engagement by a suitable wrench to afford the requisite leverage to turn the shaft in opposition to the bias of spring 53.

While I have herein disclosed and described with considerable particularity two embodiments of the invention I do not thereby intend to restrict or confine myself specifically thereto, as numerous changes may be made in the design, construction, arrangement and method of assembly of the various elements comprised therein, and the principles of the invention may be incorporated in still other embodiments if desired without departing from the spirit and scope of the invention as defined in the appended claims.

Having thus described my invention, I claim and desire to protect by Letters Patent of the United States:

1. An automatic lock for an axially reciprocable valve stem comprising a brake drum, means interconnecting the drum with the stem for oscillation in correspondence to the movements thereof, means adapted by frictional engagement with the drum to immobilize the drum including a brake shoe and yielding means operable to apply the shoe to the drum, a detent normally restraining said yielding means from applying the shoe, second yielding means normally urging the detent out of restraining relation with the first yielding means, and fluid pressure responsive means normally opposing the urge of the second yielding means but operative on reduction below a predetermined value of the fluid pressure supplied thereto to release said means to retract the detent and thereby release the first yielding means to apply the shoe to the drum.

2. An automatic lock for an axially reciprocable valve stem comprising a rack adapted for attachment to the stem, a gear meshing with the rack, a brake drum driven by the gear, a pivoted arm carrying a brake shoe adapted for engagement with the drum, a plunger pivoted to the arm, yielding means urging the plunger in a direction to move the arm to apply the shoe to the drum, a detent adapted to restrain the plunger against the urge of said yielding means, a spring biasing the detent toward its non-restraining position, and fluid pressure responsive means operative to hold the detent in restraining position when subjected to fluid pressure in excess of a predetermined value.

3. An automatic lock for an axially reciprocable valve stem comprising a rack adapted for attachment to the stem, a gear meshing with the rack, a brake drum driven by the gear, a pivoted arm carrying a brake shoe adapted for engagement with the drum, a cam rotatable in coaxial relation with the gear operative to actuate said arm, yielding means urging the cam in a direction to actuate the arm, means normally restraining said yielding means including a lever and a detent engaging the lever, and fluid pressure responsive means operative on decrease below a predetermined value of the fluid pressure supplied thereto to retract the detent from the lever to thereby release the yielding means to move the shoe into immobilizing engagement with the drum.

EMANUEL WOLFF.

REFERENCES CITED

The following references are of record in the file of this patent:

UNITED STATES PATENTS

| Number | Name | Date |
|---|---|---|
| 550,365 | Emery | Nov. 26, 1895 |
| 558,450 | Cutler | Apr. 14, 1896 |
| 1,476,989 | Massey | Dec. 11, 1923 |
| 2,339,469 | Emanuel | Jan. 18, 1944 |
| 2,368,517 | Brimble | Jan. 30, 1945 |